US011920101B2

(12) United States Patent
Despres et al.

(10) Patent No.: US 11,920,101 B2
(45) Date of Patent: Mar. 5, 2024

(54) METHOD FOR THE CONTINUOUS PRODUCTION OF A COMBUSTIBLE MATERIAL FOR AN INDUSTRIAL BOILER, CORRESPONDING MATERIAL AND INSTALLATION

(71) Applicant: EUROPEENNE DE BIOMASSE, Paris (FR)

(72) Inventors: Jean-Luc Despres, Verzenay (FR); Adriana Quintero-Marquez, Le Vesinet (FR); Frederic Martel, Reims (FR)

(73) Assignee: EUROPEENNE DE BIOMASSE, Paris (FR)

( * ) Notice: Subject to any disclaimer, the term of this patent is extended or adjusted under 35 U.S.C. 154(b) by 340 days.

(21) Appl. No.: 17/289,464

(22) PCT Filed: Oct. 28, 2019

(86) PCT No.: PCT/EP2019/079444
§ 371 (c)(1),
(2) Date: Dec. 6, 2021

(87) PCT Pub. No.: WO2020/089187
PCT Pub. Date: May 7, 2020

(65) Prior Publication Data
US 2022/0089962 A1 Mar. 24, 2022

(30) Foreign Application Priority Data

Oct. 29, 2018 (FR) ........................................ 1860022
May 20, 2019 (FR) ........................................ 1905269

(51) Int. Cl.
*C10L 5/44* (2006.01)
*C10L 5/08* (2006.01)
(Continued)

(52) U.S. Cl.
CPC ................ *C10L 5/442* (2013.01); *C10L 5/08* (2013.01); *C10L 5/363* (2013.01); *C10L 9/08* (2013.01); *C10L 2290/50* (2013.01)

(58) Field of Classification Search
CPC .. C10L 5/442; C10L 5/08; C10L 5/363; C10L 9/08; C10L 2290/50;
(Continued)

(56) References Cited

U.S. PATENT DOCUMENTS

2009/0205546 A1\* 8/2009 Kluko ........................ F23K 1/04
44/589
2011/0296748 A1\* 12/2011 Harris ...................... C10L 5/363
44/605
(Continued)

FOREIGN PATENT DOCUMENTS

CA       1141376 A    2/1983
FR       3037075 A1   12/2016
(Continued)

OTHER PUBLICATIONS

International Search Report dated Feb. 3, 2020 for corresponding International Application No. PCT/EP2019/079444, filed Oct. 28, 2019.
(Continued)

*Primary Examiner* — Ellen M McAvoy
(74) *Attorney, Agent, or Firm* — David D. Brush; Westman, Champlin & Koehler, P.A.

(57) ABSTRACT

The invention relates to a method for the manufacture of a combustible material having a lower heating value of 5.29 MWh/t or more.
According to the invention, such a method comprises
continuously introducing of a predetermined volume per minute of wood fragments into a pressurised reactor;
exposing the wood fragments to steam at a temperature of between 200 and 220° C. for a time of between 5 and
(Continued)

9 minutes, the value of said exposure time and the value of the temperature of said steam being selected so that the severity factor is between 4.05 and 4.15;

continuously extracting from said reactor the same predetermined volume of wood fragments per minute, through a plurality of orifices opening into a conduit at substantially atmospheric pressure;

separating said decompressed wood fragments and the residual steam extracted from said reactor, said wood fragments obtained after separation forming said combustible material.

15 Claims, 3 Drawing Sheets

(51) Int. Cl.
*C10L 5/36* (2006.01)
*C10L 9/08* (2006.01)

(58) Field of Classification Search
CPC .......... C10L 2290/148; C10L 2290/28; C10L 2290/30; C10L 2290/48
See application file for complete search history.

(56) References Cited

U.S. PATENT DOCUMENTS

| | | | |
|---|---|---|---|
| 2013/0326939 A1* | 12/2013 | Lawrence | C10L 9/086 44/589 |
| 2015/0361371 A1* | 12/2015 | Hoekman | C10L 5/447 44/589 |
| 2018/0072960 A1* | 3/2018 | Gronn | C10L 9/086 |
| 2019/0203134 A1* | 7/2019 | Joronen | C10L 10/06 |
| 2020/0040273 A1* | 2/2020 | Gronn | C10L 9/08 |
| 2021/0102135 A1* | 4/2021 | Bonaldi | C10L 5/48 |

FOREIGN PATENT DOCUMENTS

| | | |
|---|---|---|
| WO | 2006006863 A1 | 1/2006 |
| WO | 2015185751 A1 | 12/2015 |
| WO | 2017089648 A1 | 6/2017 |

OTHER PUBLICATIONS

Written Opinion of the International Searching Authority dated Feb. 3, 2020 for corresponding International Application No. PCT/EP2019/079444, filed Oct. 28, 2019.

English translation of the Written Opinion of the International Searching Authority dated Feb. 11, 2020 for corresponding International Application No. PCT/EP2019/079444, filed Oct. 28, 2019.

Peter Björklund et al, "Steam-exploded pellets for heat and power generation", VGB Powertech, vol. 96, No. 4, Jan. 1, 2016 (Jan. 1, 2016), pp. 52-56, XP001596829.

Ballesteros I et al, "Effect of Chip Size on Steam Explosion Pretreatment of Softwood", Applied Biochemistry and Biotechnology ; Part A: Enzyme Engineering and Biotechnology, Humana Press Inc, New York, vol. 84-86, Jan. 1, 2000 (Jan. 1, 2000), pp. 97-110, XP001010111.

* cited by examiner

METHOD FOR THE CONTINUOUS PRODUCTION OF A COMBUSTIBLE MATERIAL FOR AN INDUSTRIAL BOILER, CORRESPONDING MATERIAL AND INSTALLATION

1. SCOPE OF THE INVENTION

The field of invention is that of biomass-based fuels.

More precisely, the invention relates to a method and an installation for manufacturing a combustible material for an industrial boiler from wood chips.

The invention also finds application in the manufacture of combustible material for industrial furnaces, and for domestic boilers and stoves.

2. STATE OF THE ART

We know, for example from document CA1141376, or document WO2006/006863, techniques for manufacturing granules or pellets from lignocellulosic material based on a "steam explosion" process.

These known techniques are based on a batch production of granules in a reactor, which is filled and then emptied after exposing lignocellulosic material to pressurised steam for a few tens of seconds to a few tens of minutes, and then rapidly depressurising the reactor vessel.

They have the disadvantage of being complex and expensive to implement because the reactor has to be emptied for each batch. Moreover, during the expansion process, steam cools down significantly and is no longer usable.

3. OBJECTIVES OF THE INVENTION

The invention therefore aims in particular to compensate for the abovementioned disadvantages of the state of the art.

More specifically, the invention aims to provide a technique for manufacturing a combustible material that limits material loss.

An objective of the invention is also to provide a technique for the manufacture of a combustible material from wood chips which makes it possible to obtain a combustible material with a lower heating value greater than or equal to 5.29 MWh/t, and preferably greater than or equal to 5.6 MWh/t.

The invention also aims to provide a technique for manufacturing a combustible material with high productivity.

Another objective of the invention is to provide a technique for the manufacture of a combustible material from wood chips which makes it possible to obtain a combustible material whose water absorption is limited to 10% by mass.

Another objective of the invention is to provide a technique for manufacturing a combustible material from wood chips which makes it possible to obtain a combustible material whose loss of mechanical durability after 1 hour of immersion is less than 2% and/or whose losses in the form of dust are less than 3%.

Another objective of the invention is to provide a technique for the manufacture of a combustible material from wood chips which makes it possible to obtain a combustible material with a density greater than or equal to 650 kg/m$^3$, and preferably greater than or equal to 700 kg/m$^3$.

The invention also aims to provide a technique for manufacturing a combustible material that is reliable, simple to use and with a low cost.

4. STATEMENT OF THE INVENTION

These objectives, and others to emerge later, shall be achieved by using a method for the manufacture of a combustible material with a lower heating value of 5.29 MWh/t or more, intended in particular for an industrial boiler, from wood chips of which a substantial portion is derived from hardwood.

According to the invention such a method comprises the following steps:

obtaining from said wood chips wood fragments with a moisture content of between 5 and 25%;

continuously introducing a predetermined volume per minute of said obtained wood fragments into a pressurised reactor, said reactor being supplied with substantially saturated steam at a pressure of between 15.6 and 23.2 bars and a temperature of between 200 and 220° C. in the reactor;

exposing the wood fragments introduced into said reactor to said steam for a time between 5 and 9 minutes and sufficient to obtain a steam cracking, the value of said exposure time and the value of the temperature of said substantially saturated steam being selected so that the severity factor is between 4.05 and 4.15;

continuously extracting from said reactor a same predetermined volume of wood fragments per minute, through at least one orifice opening into a conduit at substantially atmospheric pressure, so as to cause an explosive decompression of said wood fragments extracted from said reactor in said conduit separating said decompressed wood fragments and the residual steam extracted from said reactor, said wood fragments obtained after separation forming said combustible material.

Thus, in a new way, the invention proposes to manufacture combustible material continuously by taking advantage of a "steam explosion" treatment using steam at a pressure of between 15.6 and 23.2 bars and a temperature of between 200 and 220° C. and for a time of exposure to the steam of between 5 and 9 minutes, the values of the temperature and the time of exposure being chosen so that the severity factor is between 4.05 and 4.15.

The result is a combustible material with a lower heating value greater than or equal to 5.29 MWh/t, whatever the composition of the wood chips, and with a suitable productivity allowing the material to be transformed into pellets while limiting material losses to less than 8% by mass.

Indeed, the inventors found, surprisingly and unexpectedly, that above a severity factor of 4.05 a combustible material with a lower heating value (LHV) greater than or equal to 5.29 MWh/t was obtained from all wood species. Moreover, for a severity factor of 4.15 or less, pelleting of the material in the form of pellets is relatively easy and the loss of mass is less than 8%, whatever the species of wood. On the contrary, for a severity factor higher than 4.15, the material proves to be too destructured to be processed properly into pellets and/or the material losses are too high for the material to be economically interesting. FIG. 3 illustrates the LHV values measured by the inventors for fuel material made from different hard and soft hardwood species (oak, ash, beech, poplar) or softwood (spruce) as a function of the severity factor of the treatment in the reactor. In zone 31 the lower heating value of the manufactured fuel material is less than 3.29 MWh/t, which may be insufficient for use in an industrial boiler. In zone 32, corresponding to a severity factor higher than 4.15, the inventors have found that the mass losses of the material are higher than 8% and/or the granulation of the material is difficult to obtain.

For the purposes of the invention, it is understood that a substantial portion of the wood chips is derived from hardwood when at least 10 wt % of the chips consists of hardwood. It may be envisaged to use a mixture of chips of different woods, hardwoods or softwoods, without going beyond the scope of the invention.

Finally, it should be noted that in the context of the invention, the severity factor FS is calculated in a manner known per se using the following formula:

$$FS = \log\left(\int_0^{\Delta t} e^{\left(\frac{T-100}{14.75}\right)} dt\right)$$

where T is the temperature of steam in the reactor (in ° C.) and Δt is the exposure time in the reactor (in minutes).

According to a particular aspect of the invention, said wood chips are formed from at least 50 wt % of hardwood.

For the purposes of the invention, said wood chips may also be made from softwoods in smaller proportions by weight than hardwoods.

In a particular embodiment of the invention, said wood chips are formed from at least 70 wt % of hardwood.

In a particular embodiment of the invention, said wood chips are formed from at least 80 wt % of hardwood.

In a particular embodiment of the invention, said wood chips are formed from at least 90 wt % of hardwood.

In a particularly advantageous embodiment of the invention, the exposure time of wood fragments to said steam in the reactor is between 6 and 8 minutes.

In a particularly advantageous embodiment of the invention, the temperature of steam in the reactor is between 205 and 210° C.

In an advantageous embodiment of the invention, a manufacturing method as described above further comprises a step of transforming said combustible material into pellets.

According to a particular aspect of the invention, the wood chips are made exclusively from hardwoods.

According to a preferential aspect of the invention, the moisture content of said obtained wood fragments is between 8 and 12%.

In an advantageous embodiment of the invention, during the exposure step, the value of said exposure time and the value of the temperature of said substantially saturated steam are selected so that the severity factor is between 4.05 and 4.10.

In another advantageous embodiment of the invention, during the exposure step, the value of said exposure time and the value of the temperature of said substantially saturated steam are selected so that the severity factor is between 4.10 and 4.15.

In a particular embodiment of the invention, said wood fragments are mostly larger wood fragments of dimensions between 0.5 and 14 mm.

In a particular embodiment of the invention, at least 80% of the mass of said wood fragments obtained from the wood chips is composed of wood fragments of larger dimensions between 3.15 mm and 45 mm.

In a particular embodiment of the invention, less than 0.5% of the mass of said wood fragments obtained from the wood chips is composed of wood fragments of larger dimensions greater than or equal to 85 mm.

In a particular embodiment of the invention, less than 1% of the mass of said wood fragments obtained from the wood chips is composed of wood fragments of larger dimensions greater than or equal to 45 mm.

In a particular embodiment of the invention, less than 5% of the mass of said wood fragments obtained from the wood chips is composed of wood fragments of larger dimensions less than or equal to 3.15 mm.

In a particular embodiment of the invention, during said step of continuously extracting from said reactor the same predetermined volume of wood fragments per minute, the extraction is carried out through a plurality of orifices opening into a conduit at substantially atmospheric pressure.

According to a particular embodiment of the invention, said step of obtaining wood fragments having a moisture content of between 5 and 25% comprises a step of grinding natural wood chips and/or recovered wood chips and a step of drying said ground wood chips.

Advantageously, said step of introducing said wood fragments into the reactor includes a step of compacting and pushing said fragments with a screw.

In a particular embodiment of the invention, said reactor is a vertical reactor and said wood fragments introduced into said reactor are driven towards an extraction zone close to the bottom of said reactor under the effect of gravity.

In another particular embodiment of the invention, said reactor is horizontal and in that the exposure step comprises a step of transporting said fragments between an introduction zone and an extraction zone in said reactor.

Preferably, said separation step comprises a step of centrifuging said wood fragments and/or a step of passing said wood fragments and residual steam through a cyclonic separator.

In a particular embodiment of the invention, a manufacturing method as described above comprises a step of moistening the combustible material in order to improve its capacity to be transformed into pellets.

The invention also relates to an installation for the manufacture of a combustible material with a lower heating value greater than or equal to 5.29 MWh/t, intended in particular for an industrial boiler, from wood chips of which a substantial portion is derived from hardwood, comprising:

means for transforming said wood chips into wood fragments with a moisture content of between 5 and 25%;

means for generating steam under substantially saturated pressure with a pressure of between 15.6 and 23.2 bars and a temperature of between 200 and 220° C.;

a pressurised reactor having orifices for the extraction of wood fragments and means for the continuous introduction of a predetermined volume per minute of said wood fragments into said reactor, said reactor being configured so that wood fragments introduced into said reactor may remain in the reactor for a period of between 5 and 9 minutes;

means for supplying said reactor with the steam generated by said generating means;

means for the continuous introduction of a predetermined volume per minute of said wood fragments into said reactor;

means for continuously extracting from said reactor a same predetermined volume of wood fragments per minute;

a conduit at approximately atmospheric pressure into which said orifices open;

means for separating said decompressed wood fragments from the residual steam extracted from said reactor, said wood fragments obtained after separation forming said fuel material;

said reactor, said continuous introduction and continuous extraction means being configured relative to each other so that the severity factor of the treatment in the reactor is between 4.05 and 4.15.

The invention also concerns a combustible material obtained by the implementation of the method described above having an increase in mass less than or equal to 10% after complete immersion in a container of water for one hour and draining for 30 minutes.

The invention also relates to a combustible material obtained by the implementation of the manufacturing method of a combustible material as described above, having a lower heating value greater than or equal to 5.6 MWh/t.

5. LIST OF FIGURES

Other characteristics and advantages of the invention will become clearer when reading the following description of an embodiment of the invention, given as a simple illustrative and non-limitative example, and the appended drawings, among which:

6. DETAILED DESCRIPTION OF THE INVENTION

Example of Embodiment of the Invention

Figure 1:
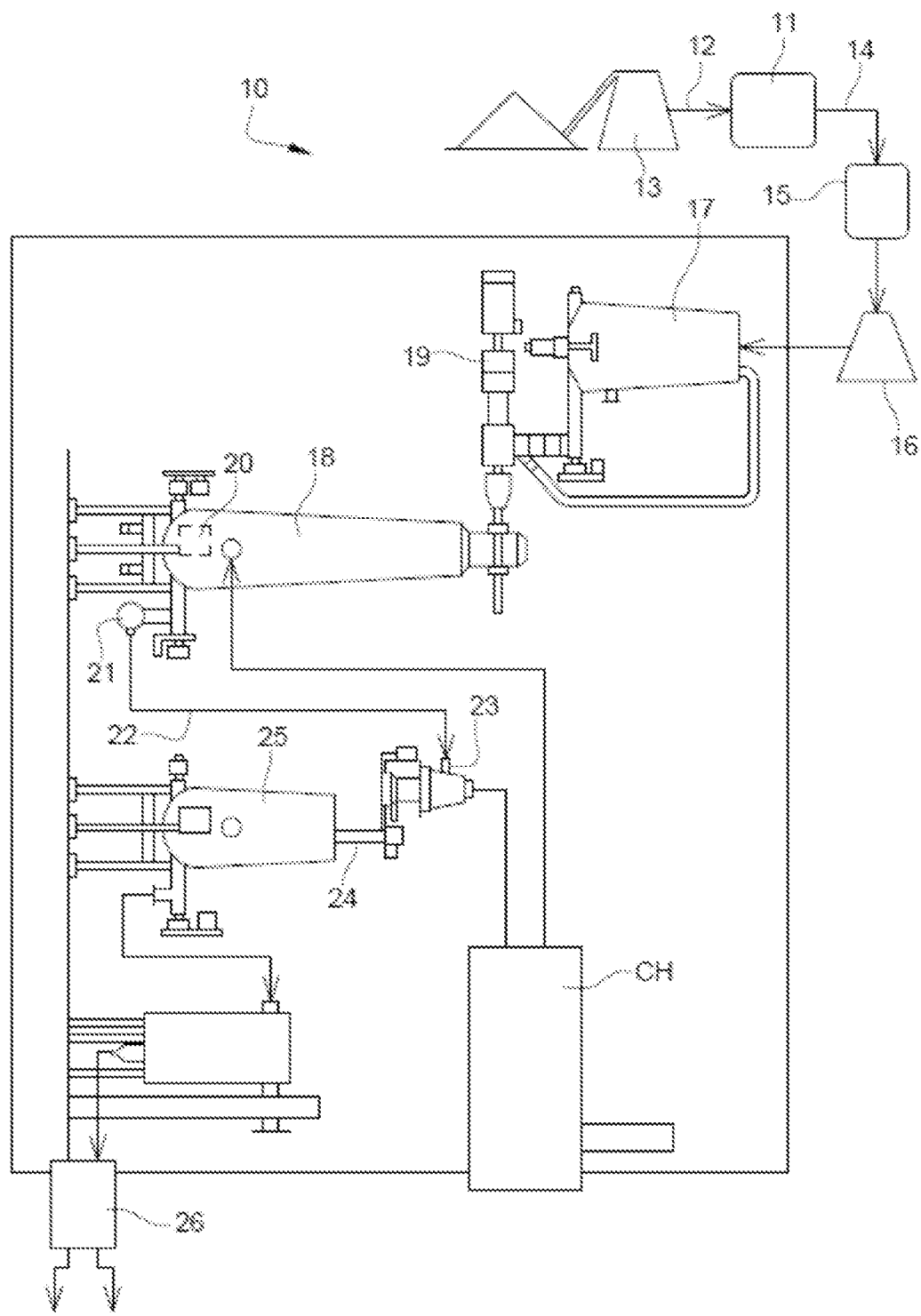
FIG. 1 is a representation of an example of embodiment of an installation for the manufacture of a combustible material according to the invention.

FIG. 1 shows an example of embodiment of an installation for the manufacture of a combustible material from wood chips according to the invention.

In this particular embodiment of the invention the wood chips used are oak and beech wood chips. In variants of this embodiment of the invention, it can be envisaged to use natural wood chips of any suitable species, such as hardwoods, softwoods, e.g. spruce, . . . and/or reclaimed wood, such as class A or class B woods.

This installation 10 comprises a hammer mill 11 fed with wood chips by means of a screw conveyor 12 which picks up the chips from a silo 13 with extraction ladders. A coarse wood separator removes oversized material before the chips enter the chipper 11. In this wet shredder 11, wood chips are shredded into larger pieces of wood, mostly between 4 and 6 millimetres in size. Silo 13 is filled by a bucket loader, which removes wood chips from heaps formed in ground storage areas.

In a variant of this particular embodiment of the invention, it can be foreseen to implement an automated line which directly barks and crushes logs, in the form of wood fragments, equipped with a conveyor for loading the silo.

These wood fragments are discharged from shredder 11 onto a conveyor belt 14, equipped with a weighing belt, which transports them to the feed hopper of a hot air dryer 15 at low temperature. In this embodiment of the invention, the temperature of the hot air in the dryer is approximately 80° C. In variants of this embodiment, temperature of the hot air can be between 70° C. and 75° C., between 75° C. and 80° C. or between 80° C. and 85° C.

This dryer 15 is in this particular embodiment of the invention a double-layer web dryer. The fragments entering the dryer are distributed homogeneously on a web by a first feed screw. The layer of wood fragments formed is conveyed through the dryer onto the web before being discharged onto the first discharge screw. By means of an additional screw conveyor, wood chips are transferred to a second feeding screw, which deposits a second layer on top of the first one in the dryer. After passing through half of the dryer a second time, the dried wood fragments, whose moisture content is now below 10%, are separated, unloaded and conveyed to a buffer storage silo 16.

A moisture sensor continuously monitors the moisture content of the wood fragments exiting the dryer and the web speed is automatically regulated to keep the moisture content of the wood fragments exiting the dryer constant.

In the dryer, exhaust fans draw in ambient air through heat exchangers in which the air is heated in two stages before being blown onto the wood fragments. This air flow ensures that the wood fragments are pressed onto the belt and very little dust escapes. Heat exchangers are water/air exchangers in which hot water from a combined heat and power plant circulates.

In variants of this embodiment of the invention, it may also be envisaged to implement a rotary drum dryer.

It should be noted that in the buffer silo a partial homogenisation of the moisture content of the dried wood fragments takes place.

The dried wood fragments are extracted from silo 16 by a planetary screw and deposited on a conveyor belt which transports them to a feed silo 17 of a reactor 18 which can continuously process 15 tons per hour of wood fragments.

Reactor 18 is a pressurised reactor into which superheated steam is injected at a pressure of 19 bar and a temperature of 250° C. at the bottom. This vertically oriented reactor is conical in shape in order to avoid the formation of plugs. The steam flow is extracted from the reactor at the upper part of the reactor. At the outlet of the reactor, the steam is returned to the boiler CH in which it was produced.

It should be noted that in reactor 18 the temperature of the steam is 209° C. and the pressure 18.7 bars.

Silo 17 is in the shape of a truncated ellipsoid to facilitate the flow of wood fragments.

Furthermore, in silo 17, a rotating scraper is used to push the wood fragments towards an extraction auger 19.

This conical auger 19, whose cross-section tapers as the auger enters reactor 18, continuously removes a predetermined quantity of dried wood fragments from silo 17, pre-compresses it and pushes it into reactor 18 under pressure through an opening in the auger. The dimensions of the conical orifice and the endless screw were selected in relation to each other so as to minimise the pressure loss in the reactor and expel the air contained in the wood fragments.

It should be noted that the compressive force exerted by the screw on the fragments advantageously expels some of the residual water present in the wood fragments.

At the end of screw 19, the compacted wood fragments form a compact block which is dispersed in the reactor by the steam flow.

The dispersed wood fragments then fall by gravity into the reactor, being heated by the steam flow, and settle on the fragments that have accumulated before them on the bottom of the reactor, where they continue to be heated by the steam flow.

It should be noted that in reactor 18 the retention time of the wood fragments is controlled according to the level of the wood fragments that have accumulated on the bottom of the reactor. In this particular embodiment of the invention, it is set at 7.5 minutes, which corresponds to a severity factor of 4.08.

On the bottom of reactor 18, a scraper mounted to pivot on a vertical axis (not shown in FIG. 1) pushes the wood fragments towards a worm 20 that extracts wood fragments from Reactor 18.

This discharge screw 20 pushes the wood fragments out of the reactor towards a valve 21 with controlled opening. The opening of this valve is continuously adjusted to control the flow of wood fragments extracted from the reactor.

Under the thrust of the steam present in the reactor and/or the screw 20, wood fragments are continuously expelled through the valve openings 21, at very high speed, into an expansion line 22 and are carried by the steam flow exiting with these wood fragments from the reactor in the expansion line 22 to a separation unit 23.

It should be noted that in the expansion line the pressure gradually decreases until a pressure of about 1.1 bar is reached at the separator. An explosive decompression of the wood fragments thus occurs, due to the re-vaporisation of part of the condensation water present in the wood fragments. This sudden expansion of the water vapour causes shear forces to build up in the wood fragments as a whole, causing the wood structure to burst mechanically.

In variants of this method of making the invention, the pressure reached at the separator is equal to 1.2, 1.3, 1.4, or 1.5 bar.

In separation unit 23, the mixture of wood fragments and steam penetrates tangentially to a fast-rotating blade. The centrifugal force generated by this blade causes the wood fragments to be thrown into a discharge duct 24, while the steam is discharged from the separator through a valve.

In a variant of this embodiment of the invention, a pressurised cyclone may be used to separate the wood fragments from the residual steam.

It should be noted that the rejected steam contains volatile matter that can advantageously be burned in a boiler.

Wood fragments thrown down a discharge pipe 24 are discharged into a storage silo 25, to be processed into pellets with a diameter of approximately 7 millimetres and an average length of 22 millimetres.

For this purpose they are conveyed by means of a chain conveyor, or a pneumatic conveyor, to a pelleting press 26 where they are compacted into pellets.

The resulting pellets are then sent to a bulk truck loading station or to a bagging and palletising station.

These pellets have a Lower Heating Value equal to 5.295 MWh/t and a density equal to 710 kg/m$^3$. They have an increase in mass of 9.5% after complete immersion in a container of water for one hour, then drained for 30 minutes.

Figure 2:
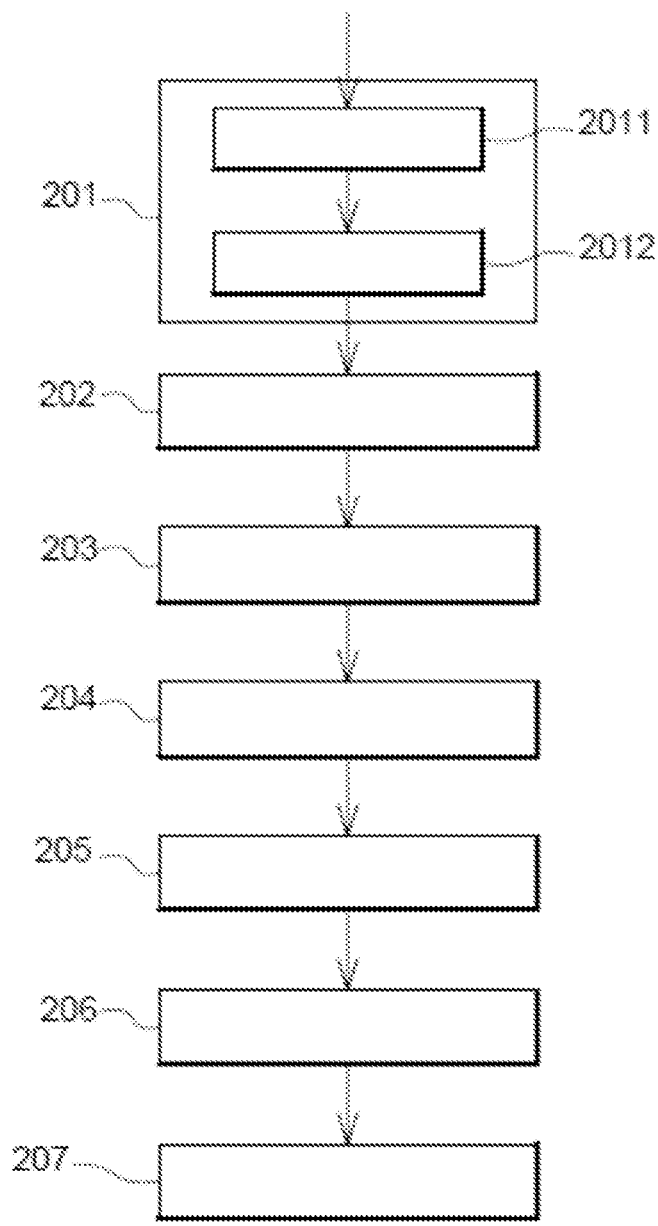
FIG. 2 illustrates in a synoptic way, the steps of another example of embodiment of a method for manufacturing a combustible material according to the invention, in the form of a diagram.
Figure 3:
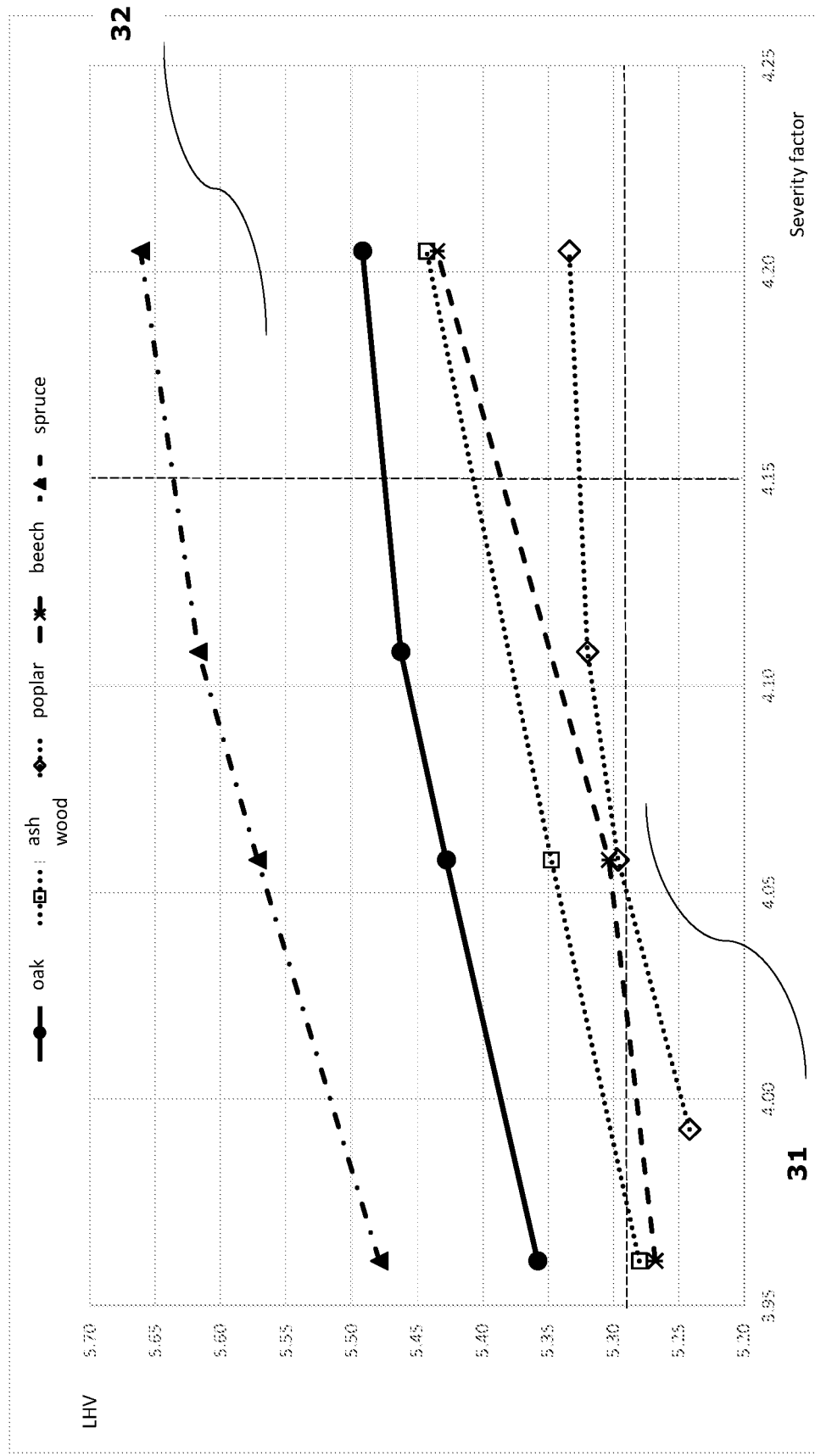
FIG. 3 illustrates the variations in the LHV of a fuel material made exclusively from oak, ash, beech, poplar or spruce chips as a function of the severity factor in the reactor.

In a variant of this particular embodiment of the invention, the wood fragments obtained after separation can be used directly as combustible material in an industrial boiler.
Another Example of Embodiment of the Invention The steps of an example of method for manufacturing a combustible material from wood chips for an industrial furnace according to the invention have been represented in the form of a block diagram on FIG. 2.

In a first step 201, wood fragments with a larger dimension of 5 millimetres are produced from barked oak wood chips. In this stage, the wood chips are ground in a wet mill (stage 2011) and then the wood fragments obtained after grinding are dried in a dryer (stage 2012) until they have a moisture content of approximately 22%.

In stage 202, a volume of 0.32 m$^3$ of dried wood fragments is introduced continuously by means of a screw into a pressurised reactor fed with slightly superheated steam at a pressure of 19 bar.

In the reactor, the wood fragments are exposed to a flow of water vapour for a period of 8 minutes (step 203).

They are then continuously extracted through orifices or valves in an expansion duct (stage 204) and transported in this duct by the steam leaving the reactor to a cyclone, where the wood fragments will be separated from the residual steam (stage 205).

The wood fragments collected at the outlet of the separator are then dried until their moisture content reaches 10% (stage 206) before being compacted into pellets (stage 207) for use as fuel in an industrial furnace.

OTHER FEATURES AND ADVANTAGES OF THE INVENTION

In variants of the above embodiments of the invention, it may also be provided for:
to moisten the wood fragments obtained after separation in order to facilitate granulation;
to implement a horizontally extending reactor and means for transporting the fragments in the reactor between the introduction zone and the extraction zone, including for example a screw conveyor.

The invention claimed is:
1. A method for manufacturing a combustible material having a lower heating value greater than or equal to 5.29 MWh/t, for an industrial boiler, from wood chips derived from a mixture of hardwood and softwood, at least 10 wt % of the wood chips being derived from hardwood, wherein the method comprises:
obtaining wood fragments with a moisture content of between 5 and 25% from these wood chips;
continuously introducing a predetermined volume per minute of said obtained wood fragments into a pressurised reactor, said reactor being supplied with substantially saturated steam at a pressure of between 15.6 and 23.2 bars and a temperature of between 200 and 220° C. in the reactor;
exposing the wood fragments introduced into said reactor to said steam for a time between 5 and 9 minutes and sufficient to obtain a steam cracking, a value of said exposure time and a value of the temperature of said substantially saturated steam being selected so that a severity factor is between 4.05 and 4.15, said severity factor being defined as:

$$FS = \log\left(\int_0^{\Delta t} e^{\left(\frac{T-100}{14.75}\right)} dt\right)$$

where T is the temperature of steam in the reactor (expressed in degrees Celsius) and $\Delta t$ is the exposure time in the reactor (expressed in minutes);
continuously extracting from said reactor a same predetermined volume of wood fragments per minute, through at least one orifice opening into a conduit at substantially atmospheric pressure, so as to cause explosive decompression of said wood fragments extracted from said reactor in said conduit; and separating said decompressed wood fragments and the residual steam extracted from said reactor, said wood fragments obtained after separation forming said combustible material.

2. The method according to claim 1, wherein said wood chips contain at least 50 wt % of hardwood.

3. The method according to claim 2, wherein said wood chips contain at least 80 wt % of hardwood.

4. The method according to claim 2, wherein said wood chips are derived substantially exclusively from hardwoods.

5. The method according to claim 1, wherein said time of exposure of the wood fragments to said steam in the reactor is between 6 and 8 minutes.

6. The method according to claim 1, wherein the temperature of said steam in the reactor is between 205 and 210° C.

7. The method according to claim 1, wherein the method further comprises transforming said combustible material into pellets.

8. The method according to claim 1, wherein the moisture content of said obtained wood fragments is between 8 and 12%.

9. The method according to claim 1, wherein the obtaining wood fragments having a moisture content of between 5 and 25% comprises grinding natural wood chips and/or recovered wood chips and drying said ground wood chips.

10. The method according to claim 1, wherein the introducing said wood fragments into the reactor comprises compacting and pushing said fragments by using a screw.

11. The method according to claim 1, wherein said reactor is a vertical reactor and said wood fragments introduced into said reactor are driven towards an extraction zone close to a bottom of said reactor under the effect of gravity.

12. The method according to claim 1, wherein said reactor is horizontal and the exposing comprises transporting said fragments between an introduction zone and an extraction zone in said reactor.

13. The method according to claim 1, wherein the separating comprises centrifuging said wood fragments and/or passing said wood fragments and residual steam through a cyclonic separator.

14. The method according to claim 1, wherein the method comprises moistening the combustible material in order to improve its ability to be transformed into pellets.

15. A combustible material obtained by carrying out the method according to claim 5 having an increase in mass of less than or equal to 10% after complete immersion in a container of water for one hour and draining for 30 minutes.

* * * * *